United States Patent [19]

Lee et al.

[11] Patent Number: 4,547,529

[45] Date of Patent: Oct. 15, 1985

[54] STORAGE STABLE, FOAMABLE TWO-PART POLYORGANOSILOXANE COMPOSITIONS

[75] Inventors: Chi-Long Lee; James A. Rabe, both of Midland, Mich.

[73] Assignee: Dow Corning Corporation, Midland, Mich.

[21] Appl. No.: 715,604

[22] Filed: Mar. 25, 1985

[51] Int. Cl.$^4$ .............................................. C08J 9/14
[52] U.S. Cl. .................................... 521/122; 521/91; 521/93; 521/97; 521/127; 521/131; 521/154; 521/78; 525/477; 528/18; 528/33; 528/34
[58] Field of Search ............... 521/91, 93, 97, 127, 521/131, 154, 78; 525/477; 528/18, 33, 34

[56] References Cited

U.S. PATENT DOCUMENTS

| | | | |
|---|---|---|---|
| 3,328,349 | 6/1967 | Lentz | 260/46.5 |
| 4,026,842 | 5/1977 | Lee et al. | 521/154 |
| 4,026,844 | 5/1977 | Kittle et al. | 204/159.13 |
| 4,026,845 | 5/1977 | Kim et al. | 524/263 |
| 4,229,548 | 10/1980 | Sattlegger et al. | 521/154 |
| 4,368,279 | 1/1983 | Modic et al. | 521/74 |
| 4,418,157 | 11/1983 | Modic | 521/134 |

*Primary Examiner*—Morton Foelak
*Attorney, Agent, or Firm*—Robert Spector

[57] ABSTRACT

Polyorganosiloxane foams are obtained by blending, dispensing and curing two-part polyorganosiloxane compositions comprising a liquid hydroxyl endblocked polydimethylsiloxane, a liquid alkyl orthosilicate as the curing agent, a catalytically effective amount of a tin compound, a blowing agent and, as a foam stabilizer, a resinous organosiloxane copolymer comprising trimethylsiloxy units, $SiO_{4/2}$ units and a specified class of fluorine-containing organosiloxane units.

21 Claims, No Drawings

4,547,529

STORAGE STABLE, FOAMABLE TWO-PART POLYORGANOSILOXANE COMPOSITIONS

BACKGROUND OF THE INVENTION

1. Field of the Invention

This invention relates to the preparation of polyorganosiloxane foams. More particularly, this invention relates to two-part room temperature vulcanizable polyorganosiloxane compositions that include a blowing agent and a novel foam stabilizer. When exposed to atmospheric pressure while still in a flowable state, the combined ingredients of the present compositions yield cured, low density polyorganosiloxane foams without requiring moisture.

2. Background Information

Polyorganosiloxane foam have been prepared using a variety of reactants and conditions. One method utilizes the reaction of an organohydrogensiloxane and a hydroxyl-containing polydiorganosiloxane. This reaction generates hydrogen as a by-product. The hydrogen serves as the blowing agent, making it unnecessary to introduce external blowing agents such as air into the composition. Foams of this type are disclosed in U.S. Pat. No. 3,923,705, issued to Smith on Dec. 2, 1975.

The introduction of air or other gaseous blowing agent into a room temperature curable polyorganosiloxane composition to form a foam that is stabilized during curing by the application of vacuum is taught in U.S. Pat. No. 4,368,279, issued to Modic and Boudreau on Jan. 11, 1983. The polyorganosiloxane compositions can be either one- or two-part. One-part compositions are curable in the presence of moisture and contain a hydroxyl endblocked polydiorganosiloxane together with any of the known moisture-reactive curing agents. The two-part compositions are cured by the platinum catalyzed reaction of silicon-bonded hydrogen atoms with ethylenically unsaturated hydrocarbon radicals or by the reaction of a hydroxyl-endblocked polydiorganosiloxane with a hydrocarbyltrialkoxysilane, an alkyl orthosilicate, or partial hydrolysis products of the silane or orthosilicate, in the presence of a suitable curing catalyst such as a tin compound.

The foams that are generated using any of the compositions disclosed in the aforementioned Modic and Boudreau patent will collapse unless kept in a vacuum chamber until the curing reaction has progressed to the extent that the foam becomes self-supporting. This requires a residence time in the vacuum chamber of at least 15 minutes. The method and compositions taught by Modic and Boudreau are useful for preparing slab stock foam. This method is not practical when a foam is prepared at the site where it is to be ultimately installed, which can be within a conduit or between the walls of a building or other structure. For such foams it would be desirable to transport the ingredients of a foamable composition, including a blowing agent, to the installation site where the ingredients are dispensed as a homogeneous mixture that spontaneously foams and cures to yield a low density product without additional processing.

Most desirably, premeasured amounts of reactants and blowing agent are packaged in one or two pressurized containers such as aerosol cans, and the foam is obtained by dispensing the contents of the container(s) at the location where the foam is to be installed.

The packaging of moisture curable polyorganosiloxane compositions in combination with a compressible gas in the inner compartment of a two-compartment aerosol can is taught in U.S. Pat. No. 4,229,548, issued to Sattleger et al. on Oct. 21, 1980. The outer compartment contains a compressed gas such as air to provide the pressure required to discharge the foamable composition from the storage container. The resultant foams are typically of relatively high density (0.58–0.81 g./cc) due to the presence of the filler required to prevent collapse of partially cured foams.

Additives for reducing the density of polyorganosiloxane foams are taught in the prior art. The use of certain resinous polyorganosiloxanes containing triorganosiloxy and $SiO_{4/2}$ units is disclosed in U.S. Pat. No. 4,418,157, issued on Modic on Nov. 29, 1985. U.S. Pat. No. 4,026,845, issued to Kim et al. on May 31, 1977, discloses using known fluorine-containing surfactants for this purpose. In their copending U.S. patent application Ser. No. 665,272 filed on Oct. 26, 1984, now U.S. Pat. No. 4,393,641, the present applicants demonstrate that neither a polyorganosiloxane of Modic or a fluorinated alcohol will prevent collapse of foams prepared by dispensing a mixture of a moisture-curable polyorganosiloxane composition and a blowing agent from an aerosol container.

SUMMARY OF THE INVENTION

We have now discovered that the classes of foam stabilizers taught in the aforementioned copending application are efficacious stabilizers for partially cured foams prepared by the action of a blowing agent within the combined ingredients of a 2-part room temperature curable polyorganosiloxane composition comprising a liquid hydroxyl endblocked dimethylsiloxane polymer, an alkyl orthosilicate and a tin-containing catalyst. These compositions do not require moisture in order to cure.

DETAILED DESCRIPTION OF THE INVENTION

This invention provides a two-part polyorganosiloxane composition which, when combined to form a homogeneous, flowable mixture, yields a cured foam under atmospheric pressure and at a temperature above the boiling point of the blowing agent contained therein, said composition comprising (A) a hydroxyl endblocked polydimethylsiloxane exhibiting a viscosity of from 0.1 to 100 Pa.s at 25° C.; (B) a liquid alkyl orthosilicate or partial hydrolyzate thereof in an amount sufficient to cure said polydimethylsiloxane; (C) an amount of a compatible tin compound sufficient to catalyze the reaction of (A) and (B); (D) a blowing agent maintained under superatmospheric pressure and having a boiling point no higher than 25° C. under atmospheric pressure, the amount of (D) being sufficient to convert said homogeneous, flowable mixture to a foam under atmospheric pressure; and (E) a foam stabilizer in an amount sufficient to stabilize said foam during the curing process, where (E) consists essentially of a resinous, benzene-soluble organosiloxane copolymer consisting essentially of $SiO_{4/2}$ units, silicon-bonded hydroxyl groups, $(CH_3)_3SiO_{1/2}$ units and fluorine-containing units selected from the group consisting of $R_aR'_bSiO_{(4-a-b)/2}$, $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by a silicon-bonded oxygen atom that is, in turn, bonded to a sequence of at least two methylene units, R' is an alkyl radical containing from 1 to 3 carbon atoms, R" is a divalent organic radical containing at least four perfluorinated carbon atoms and is bonded to the silicon atoms of said fluorine-containing units by a sequence of at least two methylene units or by a silicon-bonded oxygen atom that is, in turn, bonded to a sequence of at least two methylene units, a is 1 or 2, b is 0, 1 or 2, and the sum of a and b is 3 or less, with the proviso that when R and R" represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than $SiO_{4/2}$ and hydroxyl groups to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (E) in a trimethylsiloxy endblocked polydimethylsiloxane exhibiting a viscosity of 0.01 Pa.s at 25° C. and (b) require the addition of from 0 to 100 percent by weight of xylene to said 10 percent by weight solution to achieve optical clarity at 25° C.

The characterizing feature of the present foamable polyorganosiloxane compositions that distinguishes them from prior art foamable polyorganosiloxane compositions is the class of foam stabilizers referred to hereinafter as (E). When one of these stabilizers is combined with the remaining ingredients of the present room temperature curable polyorganosiloxane compositions described in detail hereinafter, the resultant mixture yields a useful cured foam under atmospheric pressure. The container(s) in which blowing agent is present should be of the pressure resistant type, such as an aerosol can. In preferred embodiments exemplified hereinafter, both parts of the composition contain blowing agent and are packaged in pressure resistant containers that are connected to a common mixing device to achieve a homogeneous blending of all ingredients.

The curable portion of the present foamable compositions comprises at least one liquid, hydroxyl endblocked polydimethylsiloxane, referred to hereinafter as ingredient (A). In addition to dimethylsiloxane units, (A) can contain small amounts, typically less than a total of 0.5% by weight, of monomethylsiloxy, trimethylsiloxy and $SiO_{4/2}$ units. These additional units result from impurities present in starting materials and/or intermediates used to prepare (A). The starting materials for ingredient (A) are typically mixtures of methylhalosilanes wherein the halogen is usually chlorine. The intermediates are typically cyclic polydimethylsiloxanes containing from 3 to 6 repeating units per molecule.

Ingredient (A) can also contain up to about 5% by weight of dihydrocarbylsiloxy units wherein the hydrocarbon radical is other than methyl. Typical radicals include ethyl, propyl, 3,3,3-trifluoropropyl and phenyl. Preferably (A) includes at least one polydimethylsiloxane containing an average of from about 60 to about 600 repeating units per molecule. Ingredient (A) typically exhibits a viscosity of from 0.1 to 100 Pa.s at 25° C. Most preferably the viscosity range is from 10 to 20 Pa.s at 25° C. Within this preferred range optimum combinations of a practical dispensing rate for the composition and acceptable stability of partially cured foam, i.e., minimum collapse to form solid rubber, are achieved.

The polydimethylsiloxane(s) (A) typically constitute from 80 to 95% by weight of the combination of (A), curing agent, curing catalyst and foam stabilizer.

The polydimethylsiloxane(s) cure by reacting with an alkyl orthosilicate or a partial hydrolysis product thereof, both of which are referred to hereinafter as ingredient (B). The reaction is conducted in the presence of a tin-containing catalyst and does not require moisture. The orthosilicates are represented by the general formula $Si(OR^1)_4$. In the foregoing formula, $R^1$ represents an alkyl radical containing from 1 to 4 carbon atoms.

The amount of ingredient (B) should be sufficient to completely cure ingredient (A). This typically requires from 1 to about 2.5 of the alkoxy groups present in ingredient (B) for each hydroxyl group in ingredient (A).

Using ethyl orthosilicate as the curing agent, a molar ratio of from 1.0 to 1.7 alkoxy groups per hydroxyl group is preferred because it provides a cure rate that is sufficiently rapid to reduce the amount of solid rubber formed by drainage of liquid material from partially cured foams to below about 30% by volume of the total cured product.

The reaction between ingredients (A) and (B) is catalyzed using any organic or inorganic tin compound, referred to hereinafter as ingredient (C), that is soluble in the present compositions in catalytically effective amounts. Preferred catalysts include stannous salts of carboxylic acids containing from 1 to 12 carbon atoms. Stannous octoate is particularly preferred based on its availability and catalytic activity.

The concentration of catalyst is typically from 0.1 to 5 weight percent, based on the weight of ingredient (A). Concentrations above 5 weight percent do not provide any significant increase in the rate of the curing reaction, and are therefore uneconomical. From 0.1 to 1.0 percent by weight of catalyst based on ingredient (A) is preferred for achieving a rapid cure rate under ambient conditions, thereby minimizing drainage of liquid material from the foam.

The foamable compositions of this invention are converted to foams by the action of a blowing agent, referred to hereinbefore as (D). The blowing agent can be packaged together with the ingredients of one or both parts of the present compositions in a pressure resistant container such as an aerosol can. While still in the flowable form the combined ingredients of the present compositions form a froth under atmospheric pressure. The froth cures over a period of from several minutes to several hours to a solid, elastomeric foam. The curing reaction does not require atmospheric moisture. This makes it possible to completely cure relatively thick foams.

Ingredient (D) can be any material that is a gas at 25° C. under atmospheric pressure and does not react with any other ingredient in the present compositions. Some blowing agents, such as isobutane, can be liquified under the pressure used to store the present compositions, and when liquified are both miscible and unreactive with said compositions. Other blowing agents, such as nitrogen and compressed air, are gases at the pressures under which the compositions are stored. Suitable liquifiable blowing agents include aliphatic hydrocarbons containing three or four carbon atoms, dimethyl ether, fluorocarbons and chlorofluorocarbons. Nitrogen, compressed air, carbon dioxide and isobutane are particularly preferred on the basis of their cost and availability. Chlorofluorocarbons containing one or two carbon atoms such as trifluorochloromethane will function as liquifiable blowing agents but are considered undesirable for ecological reasons in some countries.

Ingredient (D) can constitute from about 5 to about 85% of the total weight of the present foamable compositions. The optimum concentration range is dependent upon a number of variables, the most influential of which appears to be the viscosity of the foamable composition, which is, in turn, to a large extent dependent upon the viscosity of (A) and the type and amount of silica and other filler(s) present.

The optimum concentration of (D) is one that will provide the best balance between stability of the froth during curing, a sufficiently rapid discharge rate of those parts of the present two-part compositions that include ingredient (D) from their containers and the desire for a relatively low density cured foam.

It is believed that too high a concentration of (D) may destroy the cellular structure of the initially produced foam while too low a concentration may increase the density of the cured foam to an unacceptably high value.

The foam stabilizer, referred to hereinafter as ingredient (E), maintains the cellular structure of the initial froth until it has cured sufficiently to become a self-supporting foam.

Ingredient (E) is a resinous, benzene-soluble organosiloxane copolymer wherein the repeating units include, but are not limited to $SiO_{4/2}$ units, $(CH_3)_3SiO_{1/2}$ units and fluorine-containing units comprising at least four perfluorinated carbon atoms and represented by R and R" in the foregoing formulae. Each fluorine-containing unit also includes one or two silicon atoms that are joined to the fluorine-containing carbon atoms by a sequence of at least two methylene, —$CH_2$—, units or by a silicon-bonded oxygen atom that is, in turn, bonded to said sequence. This sequence forms part of the group represented by R and R".

The fluorine-containing units of (E) can be identical or different. As disclosed hereinbefore, these units exhibit the general formula $R_aR'_bSiO_{(4-a-b)/2}$ or $R"[Si(R'-)_bO_{(3-b)/2}]_2$. In these formulae R and R" represent, respectively, monovalent and divalent fluorinated organic radicals as described hereinbefore, R' is alkyl containing from 1 to 3 carbon atoms, a is 1 or 2, b is 0, 1 or 2 and the sum of a and b is 3 or less.

In addition to at least four perfluorinated carbon atoms and at least two nonfluorinated carbon atoms, R and R" can also include partially fluorinated carbon atoms. The carbon atoms of R and R" can be present in the form of linear chains, branched chains or carboxylic rings. The fluorinated carbon atoms comprising R and R" can be adjacent or separated by nonfluorinated carbon atoms, by atoms such as nitrogen, oxygen or sulfur or by divalent groups such as carbonyl, amido, carboalkoxy, and other groups which do not hydrolyze readily, will not cause premature curing of the present foamable compositions during storage and will not substantially inhibit curing of the compositions. R and R" can contain from 4 to 20 or more carbon atoms, but preferably contain from 6 to 16 carbon atoms.

The relative concentrations of $(CH_3)_3SiO_{1/2}$ units, fluorine-containing units and any additional units other than $SiO_{4/2}$ units and hydroxyl groups must be within certain limits for (E) to function effectively as a foam stabilizer. These concentration ranges are most conveniently expressed in terms of their effect on the surface tension of a hydroxyl terminated polydimethylsiloxane and on the solubility of (E) in this medium.

Specifically, a 10% by weight solution of (E) in a trimethylsiloxy endblocked polydimethylsiloxane exhibiting a viscosity of 0.01 Pa.s at 25° C. should exhibit a surface tension of less than $2.2 \times 10^{-4}$ newtons per centimeter at 25° C. Furthermore, at this concentration level and temperature the solution must be either optically clear or become optically clear following the addition of not more than 100%, based on the weight of said solution, of xylene.

While not wishing to be bound by any theory, it appears that effective foam stabilizers decrease the surface tension of a foamable composition and exhibit only limited solubility in the composition. The low degree of solubility ensures that at least a portion of the stabilizer will be present at liquid-gas interfaces of the cellular structure of the froth formed by the action of the blowing agent on the composition, thereby reducing the surface tension at the liquid-air interfaces and increasing the stability of the froth during the curing reaction. The relatively high viscosity of the present foam stabilizers is believed to impart stability to the froth during curing by increasing the elasticity of the cell walls in addition to reducing the rate at which liquid drains from the cellular structure.

The molar ratio of (E) units other than silicon-bonded hydroxyl groups and $SiO_{4/2}$ units to $SiO_{4/2}$ units is from 0.7:1 to 1.1:1, inclusive. To maximize the efficacy of (E) as a foam stabilizer for the preferred foamable compositions disclosed in the accompanying examples, this ratio is preferably from 0.7:1 to 0.9:1, inclusive.

If the foam stabilizer, the alkyl orthosilicate (B) and/or the tin-containing catalyst (C) will be in contact with one another for longer than about 24 hours prior to formation of a foam, it is usually desirable to employ a foam stabilizer wherein the R and R" radicals of the foregoing formulae for the fluorinated units are bonded to silicon by means of a silicon-carbon bond rather than a silicon-oxygen bond. The reason for this preference is that silicon-oxygen bonds are apparently more susceptible to cleaving under these conditions than silicon carbon bonds. Bond cleavage in (E) appears to destroy or substantially diminish its efficacy as a foam stabilizer.

In addition to the silicon-containing units described hereinbefore, (E) typically contains from 0.2 up to about 4% by weight of silicon-bonded hydroxyl groups. (E) can optionally contain up to about 10 weight % of $GSiO_{3/2}$ units, where G represents the residue obtained by removing the hydrogen atom from a hydroxyl group of a hydroxyl containing linear organic polymer. Useful organic polymers include homopolymers of ethylenically unsaturated alcohols such as allyl and cinnamyl alcohol, copolymers of these alcohols with ethylenically unsaturated hydrocarbons such as styrene, and polyethers or polyoxyalkylene glycols containing an average of at least one terminal hydroxyl group per molecule. Preferred polymers include styrene/allyl alcohol copolymers and polyoxyalkylene glycols such as polyoxyethylene glycol.

While not a required part of (E), the presence of $GSiO_{3/2}$ units is desirable because they may permit (E)

to function as an effective stabilizer with less fluorine than would be required if the $GSiO_{3/2}$ units were absent. The concentration of fluorine-containing units required to decrease the surface tension of the composition sufficiently to stabilize a foam is sometimes less than the concentration required to sufficiently insolubilize the stabilizer in the foamable composition. Because in many instances hydroxyl-containing organic polymers corresponding to the formula GH are considerably less expensive than the fluorine-containing intermediates used to prepare (E), it may be economically desirable to employ these organic polymers in place of the additional fluorine-containing intermediate needed to sufficiently decrease the solubility of (E) in (A).

Resinous copolymers wherein fluorine-containing hydrocarbon radicals are bonded to silicon through at least two methylene units can be prepared using the general procedure described by Daudt et al. in U.S. Pat. No. 2,676,182, issued on Apr. 20, 1954. The disclosure of this patent is incorporated herein in its entirety by reference. The reaction of fluorine-containing silanes with sodium silicate is disclosed in U.S. Pat. No. 3,328,349, issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont de Nemours and Co.) is acidified to the proper pH by adding it to a mixture of hydrochloric acid and isopropanol. The resulting acidic silica hydrosol can then be reacted with a source of $R_aR'_bSiO_{(4-a-b)/2}$ siloxane units, such as $(R)(CH_3)_2SiOCH_3$ or $(R)(CH_3)_2SiCl$, and a source of $(CH_3)_3SiO_{1/2}$ units, such as $(CH_3)_3SiCl$. These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble ingredients such as isopropyl alcohol. Preferably the resinous copolymers prepared by this method are washed with water to remove most, but not all of the acid. The products typically have sufficient acid to exhibit an acid number of from 0.2 to 2.0.

The fluorinated silanes and siloxanes that can be used to prepare (E) are either known or can be synthesized using known methods. The synthesis of preferred silanes is described in the accompanying examples.

If organic solvents are used to prepare the foam stabilizer (E), these are preferably replaced with a trimethylsiloxy endblocked polydimethylsiloxane exhibiting a viscosity of from about 0.001 to about 1 Pa.s at 25° C.

If it is desired to incorporate repeating units of the foregoing $GSiO_{3/2}$ type into the copolymer, this can be accomplished by including the corresponding hydroxyl-containing polymer GH in the reaction mixture together with a fluorinated alcohol. Suitable polymers have been discussed hereinbefore.

A second method for preparing foam stabilizers containing either SiO or SiC bonds comprises reacting nonfluorinated resinous copolymers of the type described in the aforementioned Daudt et al. patent with a fluorinated material. Suitable copolymers contain $(CH_3)_3SiO_{1/2}$ and $SiO_{4/2}$ units in addition to from 0.5 to 4.0% by weight of silicon-bonded hydroxyl groups. The copolymers are reacted with at least one fluorine-containing silane of the formula $R_aR'_bSiY_{(4-a-b)}$ or $ySi(R')_2R''(R')_2SiY$, partial hydrolysis products of either of the foregoing silanes or at least one fluorine-containing alcohol of the formula $F(C_nF_{2n})(CH_2)_2OH$ where R, R', R'', a and b are defined hereinbefore, Y is a halogen, preferably chlorine or other hydrolyzable group, and the average value of n is from 4 to 20.

In preferred embodiments of (E), R of the foregoing formula represents $F(C_nF_{2n})(CH_2)_2O_c$, R' is methyl, R'' represents $-O_c(CH_2)_2(C_nF_{2n})(CH_2)_2O_c-$, c is 0 or 1, and the average value of n is at least 4. Most preferably R and R'' represent a mixture of homologous units wherein n is an even integer from 4 to 14 inclusive.

The silanes employed to prepare preferred embodiments of (E) wherein c of the foregoing formulae is 0 exhibit the formulae $F(C_nF_{2n})CH_2CH_2Si(CH_3)_dY_{3-d}$ or $Y_{3-d}(CH_3)_dSiCH_2CH_2(C_nF_{2n})CH_2CH_2Si(CH_3)_dY_{3-d}$ where d is 0, 1 or 2 and Y and n are as defined hereinbefore. These silanes can be prepared by hydrosilation of a fluorinated olefin of the formula $F(CF_2)_nCH=CH_2$ or $CH_2=CH(CF_2)_nCH=CH_2$ with a silane of the formula $(CH_3)_dY_{3-d}SiH$. The fluorinated olefin can be a single compound or a mixture of homologs wherein n is an even integer having a value of from 4 to 14, inclusive. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, issued to Kim and Pierce on Nov. 16, 1971 and is incorporated herein in its entirety by reference. The silanes can be replaced at least in part by their hydrolysis products.

Foam stabilizers where c is 1 and a method for preparing these stabilizers are claimed in copending U.S. patent application Ser. No. 664,898, filed on Oct. 26, 1984, in the name of Joseph Keil.

Preferred foam stabilizers of the foregoing formula where c is 0 are claimed in copending U.S. patent application Ser. No. 664,897, filed on Oct. 26, 1984, in the names of Lee, Lim and Wright.

The foam stabilizer (E) typically constitutes from 0.2 to about 25% by weight of the present foamable compositions, exclusive of the weight of the volatile blowing agent (D). This value is preferably from 1 to 10% by weight. The minimum concentration of (E) that will adequately maintain the structure of the initially produced liquid froth during curing is a function of several variables, including viscosity of the foamable composition, the rate at which the composition cures and the fluorine content of (E). Higher levels of fluorine are desirable, because as the fluorine content of (E) increases, it becomes less compatible with the other ingredients of the present foamable compositions, and is more likely to migrate to the surface of the bubbles that constitute the forth formed when the blended ingredients of the present compositions are dispensed under atmospheric pressure. As disclosed hereinbefore, an alternative method for decreasing the compatibility of (E) with the composition is to incorporate units of the foregoing formula $GSiO_{3/2}$ into (E).

The foamable compositions of this invention can optionally contain up to 50% by weight, based on the total weight of the composition, of finely divided fillers such as silica that are conventionally employed in RTV polyorganosiloxane compositions.

Fume silicas are preferably used at concentrations of from 10 to 20%, based on the weight of the foamable composition.

Finely divided silica fillers are typically treated with relatively low molecular weight, liquid hydroxyl containing organic or organosilicon compounds to prevent a phenomenon referred to in the art as "crepe-hardening" of polyorganosloxane compositions. The filler particles can be treated before being added to the composition or the particles can be treated "in situ" by having a suitable treating material present as an ingredient in the compositions. Known filler treating agents include hydroxyl-containing silanes and polydiorganosiloxanes where the hydrocarbon groups present on silicon are lower alkyl such as methyl, and can also include phenyl, vinyl and 3,3,3-trifluoropropyl.

Other useful fillers include chopped and flocked glass fibers and flame blown glass microfibers. The glass fibers are preferably less than about 8 mm long and less than about $5 \times 10^{-3}$ mm in diameter. Larger diameter fibers can be used, but are not as effective in modifying the flow properties of the foamable composition as the preferred fibers. The larger fibers may also interfere with dispensing of the composition through conventional aerosol valves by clogging passage within the valve.

If a black or grey foam is acceptable, up to about 30% by weight, based on the foamable composition, of carbon black can be added in place of or in combination with glass or other types of fibers.

Compositions containing silica in combination with glass fibers and/or carbon black will be nonslumping when used in combination with liquified blowing agents such as isobutane or chlorinated fluorocarbons such as trifluorochloromethane. A nonslumping composition will not flow appreciably when dispensed onto a vertical or a sloping surface. This characteristic is very desirable if the present compositions are used to fill joints or other open spaces in a vertical member such as a wall, or in the lower surface of a horizontally oriented member such as the ceiling of a building or other structure.

If those parts of the present two-part compositions that are packaged in pressurized containers are very viscous and/or contain a filler that impedes flow of the ingredients through the valve of a pressurized container, it may be desirable to package these ingredients in one compartment of a two-compartment can wherein only the compartment containing the ingredients is equipped with a dispensing valve. The second compartment is separated from the first by means of a piston or the wall of a flexible container and contains a propellant that can be either of the same composition as the blowing agent or a more volatile material. The propellant provides the additional pressure required to dispense ingredients of the foamable composition from the pressurized container at a faster rate than can be achieved using only the blowing agent. Two-compartment aerosol cans are known in the art.

All other conditions being equal, the maximum rate at which the two parts of a foamable composition of this invention can be dispensed from their storage containers and the rate at which liquid materials will drain during curing of the foam formed from these compositions are both inversely proportional to viscosity of the combined ingredients. The viscosity can be determined by using a rotating spindle type viscometer. A Brookfield viscometer is preferred. To obtain useful foams the viscosity of the combined ingredients of the composition should be from 0.5 to 500 Pa.s at 25° C., measured in the absence of the blowing agent (D). The optimum combination of a relatively rapid dispensing rate and stability of the resultant cellular structure during curing is achieved without an excessive amount of blowing agent when the viscosity of the foamable composition in the absence of blowing agent is from 1 to 100 Pa.s at 25° C.

The two-part foamable compositions of this invention can be prepared by packaging the foregoing ingredients, (A), (B), (C), (D) and (E) together with any of the optional additives discussed hereinbefore. To avoid premature curing, the alkyl orthosilicate and tin-containing catalyst should not be packaged in the same container. Formulations containing a blowing agent should be packaged in pressure-resistant containers.

Prior to being exposed to atmospheric pressure the ingredients of the present compositions should be thoroughly blended. Static and dynamic mixing devices for accomplishing this are known in the art. A preferred means is a static mixer consisting of a long tube having baffles arranged along the interior surface to generate the turbulence required to achieve adequate mixing of the materials passing through the tube.

The pressure-resistant containers used to package ingredients of the foamable compositions are equipped with valves wherein the passages through which the ingredients flows are of sufficient diameter to permit discharge of the ingredients at a sufficiently rapid rate to form a useful foam. It is also desirable that the passages be of a sufficient diameter to facilitate removal of any cured material by mechanical means such as a wire or probe.

Preferably the valves are of the type recommended for dispensing relatively viscous, foamable materials such as whipped cream. The discharge tube and valve body can be combined into a single elastomeric member that is force fitted into the opening of the container. One or more openings in the valve body are normally closed off by contact with the seat. Displacement of the discharge tube by finger pressure moves the opening(s) in the valve body away from the seat, thereby allowing the contents of the pressurized container to flow into the valve body and through the discharge tube.

Aerosol valves wherein the valve body and spray head are separate units and the valve is equipped with a spring loaded piston are suitable for use with unfilled foamable compositions and those containing finely divided fillers such as silica.

In accordance with a preferred preparative method, the polydimethylsiloxane(s), alkyl orthosilicate and foam stabilizer are blended to homogeneity and placed in one pressurizable container equipped with a suitable dispensing valve. The desired amount of blowing agent (D) is then inserted into the container by appropriate means, usually through the dispensing valve, and the container is shaken to uniformly dispense the blowing agent throughout the composition. Methods and apparatus for packaging foamable compositions together with propellants such as isobutane and nitrogen into pressurized containers are well known in the art and do not form part of this invention.

A homogeneous mixture of polydimethylsiloxane(s), tin-containing catalyst, foam stabilizer and blowing agent is packaged in a second pressurizable container. Another method for packaging the two parts of the present compositions employs a single pressure-resistant container equipped with two compartments and a codispensing valve having access to both compartments. Containers of this type are commercially available.

Preferred two-part foamable compositions of this invention are stable for periods of up to six months or more when stored in separate pressure resistant containers or compartments. When the ingredients of the compositions are simultaneously dispensed and blended, the resultant mixture is converted to a liquid froth by action of the blowing agent (D). Over a period of several minutes, a self supporting foam is formed by the reaction of ingredients (A) and (B) in the presence of the catalyst, ingredient (C). During this interval the foam stabilizer (E) minimizes collapse of the cellular structure and drainage of liquid materials.

Cured foams prepared using the compositions of this invention are typically of the closed cell type. Those which do not contain silica or other filler typically exhibit densities of from 0.20 to about 0.55 g/cm³. The size of the cells in the foam will typically be less than 4 mm in diameter. Preferably the size range is from 0.2 to 2 mm, and the cell concentration is typically greater than 4 per linear cm.

The present foams can be used in many applications where it is desirable to utilize the unique properties of room temperature curable polyorganosiloxane elastomers in a low density material that will cure in the absence of atmospheric moisture. The lower density of the foams relative to corresponding noncellular elastomers makes it possible to cover larger areas with the same weight of material. An additional advantage is the insulating properties provided by the closed cell structure of the foam.

The ability of compositions containing the preferred foam stabilizers to remain stable in pressurized containers make it possible to combine in two portable containers or a dual chamber container, all of the ingredients required to form a foam. The container(s) can then be transported to the location where the foam is to be prepared rather than having to transport the individual ingredients to the location. This is particularly advantageous in those instances when small amounts of foam are dispensed from the container(s) over a relatively long period of time.

The following example discloses preferred embodiments of the present two-part foamable compositions and should not be interpreted as limiting the scope of the accompanying claims. All parts and percentages are by weight unless otherwise specified.

EXAMPLE 1

This example demonstrates the effect of varying the concentration of alkyl orthosilicate on the stability of a foam prepared using a two-part foamable composition of this invention. Two-part foamable compositions designated I and II were prepared by combining the ingredients listed in the accompnying table. Ingredient (A) was a hydroxyl endblocked polydimethylsiloxane that exhibited an average molecular weight of 44,000, and contained 0.09 weight percent of hydroxyl groups. Ingredient (B) was ethyl orthosilicate, ingredient (C) was stannous octoate and the blowing agent (D) was a mixture of isobutane and propane in a weight ratio of 84:16, respectively. Ingredient (E), the foam stabilizer, was a 50% by weight solution in a trimethylsiloxy endblocked polydimethylsiloxane of a product obtained by reacting a mixture of homologous fluorinated alcohols of the general formula $F(CF_2CF_2)_pCH_2CH_2OH$ where the average value of p is 4 with an organosiloxane copolymer of the type described by Daudt and Tyler in U.S. Pat. No. 2,676,182. The copolymer contained $(CH_3)_3SiO_{\frac{1}{2}}$ units and $SiO_{4/2}$ units in a molar ratio of about 0.7:1, respectively, and about 3% by weight of silicon-bonded hydroxyl groups.

The foam stabilizer was prepared by combining 680 parts of the aforementioned organosiloxane copolymer, 800 parts xylene, 4.2 parts of a 1 normal aqueous solution of potassium hydroxide, and 120 parts of the aforementioned fluorinated alcohol mixture in molten form. The reaction vessel was equipped with a reflux condenser and Dean-Stark apparatus. The reaction mixture was heated at the boiling point for a time sufficient to remove substantially all of the byproduct water and then allowed to cool to 50° C., at which time solid carbon dioxide was slowly added to neutralize the potassium hydroxide. The reaction product was then filtered and combined with 800 parts of a trimethylsiloxy endblocked polydimethylsiloxane exhibiting a viscosity of 0.01 Pa.s, following which the xylene and other volatile materials were removed by distillation under reduced pressure. The final clear solution contained 50% by weight of the reaction product in the polydimethylsiloxane.

The foam stabilizer included repeating units of the formulae $(CH_3)_3SiO_{\frac{1}{2}}$, $SiO_{4/2}$ and fluorine-containing units of the average formula $F(CF_2)_8CH_2CH_2OSiO_{3/2}$. The surface tension exhibited by a 10% by weight solution of the foam stabilizer in a trimethylsiloxy-endblocked polydimethylsiloxane having a viscosity of 0.01 Pa.s at 25° C. was less than $2.2 \times 10^{-4}$ newtons per cm. when measured at 25° C.

The amounts of ingredients (A), (B), (C), and (E) that were blended to form parts a and b of compositions I and II are summarized in the following table, in addition to the molar ratio of ethoxy to hydroxyl groups present in ingredients (B) and (A), respectively.

| Composition | I | | II | |
|---|---|---|---|---|
| Part | a | b | a | b |
| Ingredient | | | | |
| A (parts) | 75 | 75 | 75 | 75 |
| B (parts) | — | 0.70 | — | 0.45 |
| C (parts) | 0.75 | — | 0.75 | — |
| E (parts) | 3.75 | 3.75 | 3.75 | 3.75 |
| Ethoxy/hydroxyl (molar ratio) | 1.7 | | 1.1 | |

Parts a and b of compositions I and II were each placed in individual aerosol containers and thoroughly blended. A cap and valve assembly was then secured into position on each container and 12 parts of blowing agent were injected into each container through the valve. Parts I(a) and I(b) were discharged in approximately a 1:1 weight ratio into a common conduit that terminated in an 11.4 cm. long commercially available static mixer (a plastic tube having baffles arranged along the interior surface). The material emerging from the static mixer was a stable, fine-celled froth that began to solidify after 1.5 hours. The foam required more than 24 hours to cure completely, during which time a layer of solid rubber equal to about 30% by volume of the cured material formed beneath the foam layer.

Parts II(a) and II(b) were packaged and dispensed as described hereinbefore for I(a) and I(b). In this instance, the molar ratio of ethoxy to hydroxyl groups was 1.1 vs. 1.7 for composition I. The foam obtained from composition II began to solidify within 45 minutes and was completely cured, except for a tacky surface, after about 18 hours. The diameters of the cells in the foam were less than 1 mm and the density of the entire cured sample was 0.45 g./cc. The sample contained about 5% by volume of solid rubber, located beneath the foam layer.

That which is claimed is:

1. A two-part polyorganosiloxane composition which when combined to form a homogeneous, flowable mixture yields a cured foam under atmospheric pressure and at a temperature above the boiling point of the blowing agent contained therein, said composition comprising (A) a hydroxyl endblocked polydimethylsiloxane exhibiting a viscosity of from 0.1 to 100 Pa.s at 25° C.;

(B) a liquid alkyl orthosilicate or partial hydrolyzate thereof in an amount sufficient to cure said polydimethylsiloxane with the proviso that ingredients (A) and (B) are maintained in separate parts of said composition;

(C) an amount of a compatible tin compound sufficient to catalyze the reaction of (A) and (B);

(D) a blowing agent maintained under superatmospheric pressure and having a boiling point of no higher than 25° C. under atmospheric pressure, the amount of (D) being sufficient to convert said homogeneous flowable mixture to a foam under atmospheric pressure; and (E) a foam stabilizer in an amount sufficient to stabilize said foam during the curing process, where (E) consists essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR'_bSiO_{(4-a-b)/2}$, $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by a silicon-bonded oxygen atom that is, in turn, bonded to a sequence of at least two methylene units, R' is an alkyl radical containing from 1 to 3 carbon atoms, R'' is an divalent organic radical containing at least four perfluorinated carbon atoms and is bonded to the silicon atoms of said fluorine-containing units by a sequence of at least two methylene units or by a silicon-bonded oxygen atom that is, in turn, bonded to a sequence of at least two methylene units, a is 1 or 2, b is 0, 1 or 2, and the sum of a and b is 3 or less with the proviso that when R and R'' represent fluorine-containing units bonded to silicon via an oxygen atom the orgnosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than $SiO_{4/2}$ and hydroxyl groups to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (E) in a trimethylsiloxy endblocked polydimethylsiloxane exhibiting a viscosity of 0.01 Pa.s at 25° C. and (b) require the addition of from 0 to 100 percent by weight of xylene to said 10 percent by weight solution to achieve optical clarity at 25° C.

2. A composition according to claim 1 where the viscosity of the polydimethylsiloxane is from 10 to 20 Pa.s at 25° C.

3. A composition according to claim 1 where said alkyl orthosilicate is ethyl orthosilicate or a partial hydrolysis product thereof.

4. A composition according to claim 3 where the concentration of (B) is equivalent to from 1.0 to 1.7 alkoxy groups in (B) per hydroxyl groups present in (A).

5. A composition according to claim 1 where said tin compound is a stannous salt of a carboxylic acid.

6. A composition according to claim 5 where said tin compound is stannous octoate.

7. A composition according to claim 1 where the fluorine-containing units of (E) are of the formula $R_aR'_bSiO_{(4-a-b)/2}$ where R is $F(C_nF_{2n})(CH_2)_2O_c$; R' is methyl; a is 1; b is 0, 1 or 2; c is 0 or 1 and where in each of said fluorine-containing units n represents an integer that is identical or different with respect to the value of n in other fluorine-containing units of (E), the average value of n being from 4 to 20, inclusive.

8. A composition according to claim 7 where c is 0 and (E) is the reaction product of an organosiloxane copolymer, consisting essentially of $(CH_3)_3SiO_{\frac{1}{2}}$ units, $SiO_{4/2}$ units and silicon-bonded hydroxyl groups, with a mixture of homologous silanes of the formula $F(C_nF_{2n}CH_2CH_2Si(CH_3)_bCl_{3-b}$ or a hydrolyzate of said mixture, where n varies among said silanes and represents an even integer from 4 to 14, inclusive.

9. A composition according to claim 7 where b is 1 and (E) is the reaction product of an organosiloxane copolymer consisting essentially of $(CH_3)_3SiO_{\frac{1}{2}}$ units, $SiO_{4/2}$ units and silicon-bonded hydroxyl groups with a mixture of homologous fluorine-containing alcohols of the general formula $F(CF_2)_n(CH_2)_2OH$, where n represents an even integer from 4 to 14, inclusive.

10. A composition according to claim 9 where (E) contains up to 10% of $GSiO_{3/2}$ units.

11. A composition according to claim 10 where G represents the residue of a styrene/allyl alcohol copolymer.

12. A composition according to claim 1 where (E) constitutes from 1 to 10% of the weight of said composition exclusive of said blowing agent.

13. A composition according to claim 1 where said blowing agent is selected from the group consisting of aliphatic hydrocarbons containing from 1 to 4 carbon atoms, and aliphatic chlorofluorocarbons containing 1 or 2 carbon atoms.

14. A composition according to claim 13 where said blowing agent is isobutane.

15. A composition according to claim 1 which contains a finely divided filler at a concentration level of up to 50%, based on the weight of said composition.

16. A composition according to claim 15 where said filler is silica.

17. A composition according to claim 16 where said composition includes a treating agent for said silica.

18. A composition according to claim 1 where the viscosity of said composition in the absence of said blowing agent is from 1 to 100 Pa.s at 25° C.

19. A composition according to claim 1 wherein both parts of said composition contain said blowing agent and are maintained under superatmospheric pressure in at least one pressurized container.

20. A composition according to claim 19 where said pressurized container is an aerosol can.

21. A composition according to claim 1 where (B) and (C) are contained in different parts of said composition.

* * * * *

UNITED STATES PATENT AND TRADEMARK OFFICE
CERTIFICATE OF CORRECTION

PATENT NO. : 4,547,529

DATED : October 15, 1985

INVENTOR(S) : Chi-Long Lee and James Alan Rabe

It is certified that error appears in the above-identified patent and that said Letters Patent is hereby corrected as shown below:

Column 2, line 14 - Delete "on" and substitute therefor ---to---

Column 8, line 4 - Delete "y" and substitute therefor ---Y---

Column 8, line 58 - Delete "forth" and substitute therefor ---froth---

Column 9, line 25 - Delete "passage" and substitute therefor ---passages---

Column 11, line 56 - Delete "accompnying" and substitute therefor ---accompanying---

Column 13, line 56 - Delete "orgnosiloxane" and substitute therefor ---organosiloxane---

Signed and Sealed this

Twenty-ninth Day of March, 1988

Attest:

DONALD J. QUIGG

*Attesting Officer*   *Commissioner of Patents and Trademarks*